(12) United States Patent
Schulze-Ganzlin et al.

(10) Patent No.: US 12,507,975 B2
(45) Date of Patent: Dec. 30, 2025

(54) INTRAORAL X-RAY SENSOR FOR AUTOMATIC EXPOSURE CONTROL

(71) Applicants: DENTSPLY SIRONA Inc., York, PA (US); SIRONA DENTAL SYSTEMS GMBH, Bensheim (DE)

(72) Inventors: Ulrich Schulze-Ganzlin, Lorsch (DE); Kai Lindenberg, Wersau (DE)

(73) Assignee: Dentsply Sirona Inc., York, PA (US)

( * ) Notice: Subject to any disclaimer, the term of this patent is extended or adjusted under 35 U.S.C. 154(b) by 0 days.

(21) Appl. No.: 18/576,820

(22) PCT Filed: Jun. 27, 2022

(86) PCT No.: PCT/EP2022/067571
§ 371 (c)(1),
(2) Date: Jan. 5, 2024

(87) PCT Pub. No.: WO2023/280612
PCT Pub. Date: Jan. 12, 2023

(65) Prior Publication Data
US 2024/0307020 A1  Sep. 19, 2024

(30) Foreign Application Priority Data
Jul. 6, 2021 (EP) ..................................... 21183846

(51) Int. Cl.
*A61B 6/00* (2024.01)
*A61B 6/51* (2024.01)

(52) U.S. Cl.
CPC .............. *A61B 6/542* (2013.01); *A61B 6/488* (2013.01); *A61B 6/512* (2024.01); *A61B 6/548* (2013.01)

(58) Field of Classification Search
CPC ......... A61B 6/542; A61B 6/488; A61B 6/548; A61B 6/512
See application file for complete search history.

(56) References Cited

U.S. PATENT DOCUMENTS

| 6,898,268 B2 | 5/2005 | Maekilae et al. |
| 8,119,990 B2 * | 2/2012 | Zeller .................... H04N 23/30 250/370.09 |

(Continued)

FOREIGN PATENT DOCUMENTS

| EP | 1859659 A1 | 11/2007 |
| EP | 3399906 A1 | 11/2018 |

(Continued)

OTHER PUBLICATIONS

International Search Report; PCT/EP2022/067571; Sep. 21, 2022 (completed); Sep. 29, 2022 (mailed).

(Continued)

*Primary Examiner* — Sean D Mattson
(74) *Attorney, Agent, or Firm* — SCHWEGMAN LUNDBERG & WOESSNER, P.A.

(57) ABSTRACT

The present invention relates to an intraoral X-ray sensor for use with an intraoral X-ray system having an automatic exposure control (AEC) functionality, characterized in that the intraoral X-ray sensor includes an exposure analysis unit, an imaging X-ray detector, and a communication interface, wherein a scout shot or scout video stream received from the imaging X-ray detector is analyzed by the exposure analysis unit in the intraoral X-ray sensor in order to record information on the exposure level of the scout image or video stream and to forward this information by means of the communication interface to a decision unit of the intraoral X-ray system, which is arranged externally to the intraoral X-ray sensor, and adapted for evaluation and decision of further exposures.

4 Claims, 1 Drawing Sheet

(56) References Cited

U.S. PATENT DOCUMENTS

| | | | | |
|---|---|---|---|---|
| 2003/0026387 | A1* | 2/2003 | Makila | A61B 6/512 |
| | | | | 378/168 |
| 2007/0126752 | A1* | 6/2007 | Inglese | H04N 23/30 |
| | | | | 345/589 |
| 2007/0269002 | A1* | 11/2007 | Mazuir | H05G 1/54 |
| | | | | 378/38 |
| 2013/0301799 | A1* | 11/2013 | Kang | A61B 6/5235 |
| | | | | 378/62 |
| 2015/0250436 | A1* | 9/2015 | Hyde | A61B 6/512 |
| | | | | 378/62 |
| 2016/0262715 | A1* | 9/2016 | Charnegie | A61B 6/465 |
| 2017/0188987 | A1* | 7/2017 | Liu | A61B 6/512 |

FOREIGN PATENT DOCUMENTS

| | | | | |
|---|---|---|---|---|
| EP | 3673810 | A1 * | 7/2020 | A61B 6/512 |
| WO | 2017120621 | A1 | 7/2017 | |
| WO | WO-2023280612 | A1 | 1/2023 | |

OTHER PUBLICATIONS

Written Opinion of the International Searching Authority; PCT/EP2022/067571; Sep. 21, 2022 (completed); Sep. 29, 2022 (mailed).
"International Application Serial No. PCT/EP2022/067571, International Preliminary Report on Patentability mailed Jan. 18, 2024", 8 pgs.

* cited by examiner

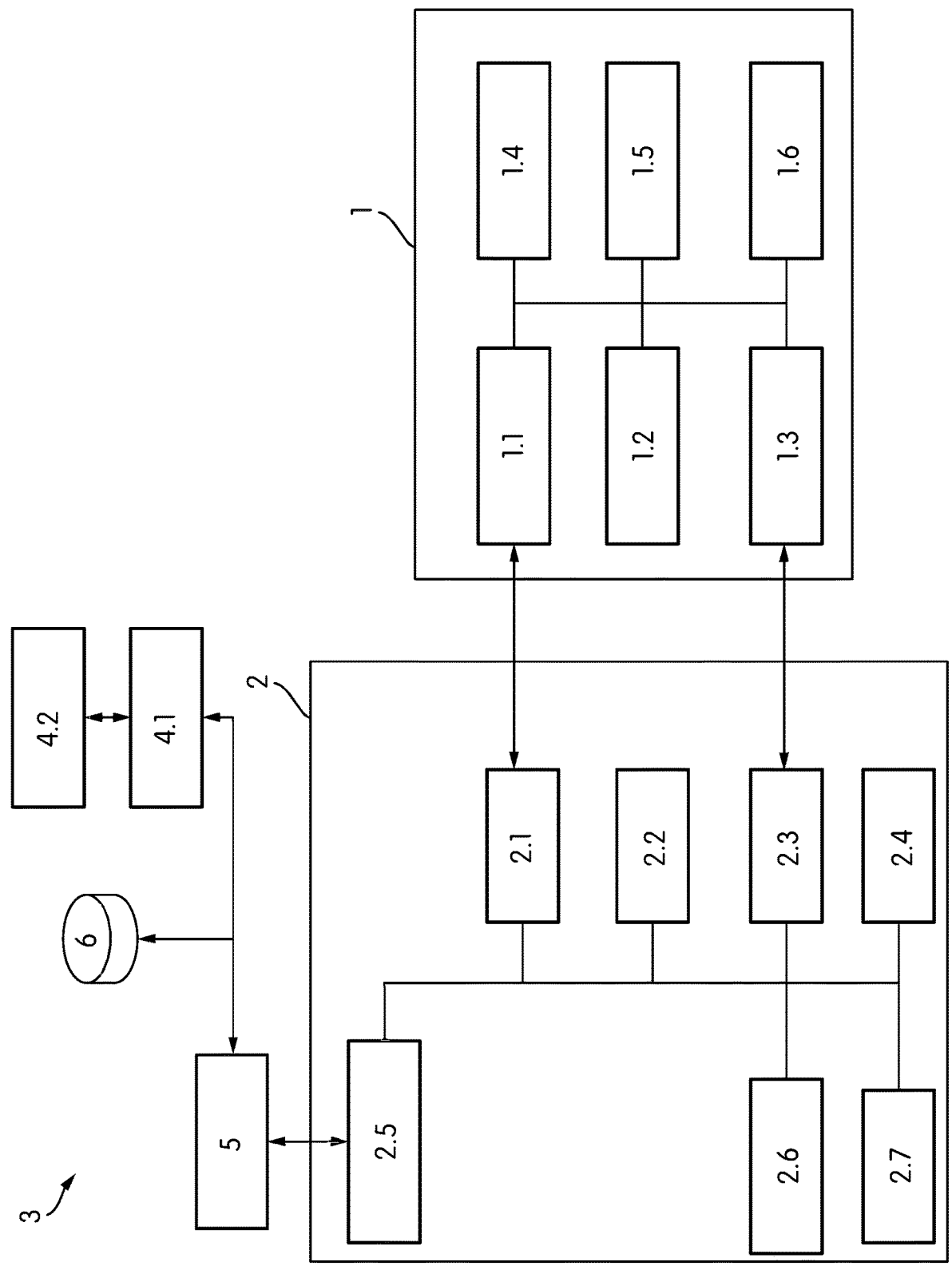

INTRAORAL X-RAY SENSOR FOR AUTOMATIC EXPOSURE CONTROL

CROSS-REFERENCE TO RELATED APPLICATIONS

This is a National Phase application of International Application No. PCT/EP2022/067571, filed Jun. 27, 2022, which claims the benefit of and priority to European Application Ser. No. 21183846.1, filed on Jul. 6, 2021, which are herein incorporated by reference for all purposes.

TECHNICAL FIELD OF THE INVENTION

The present invention relates to an intraoral X-ray system with automatic exposure control (AEC) function, comprising an intraoral X-ray sensor and a dental X-ray unit.

BACKGROUND OF THE INVENTION

The automatic exposure control (AEC), namely the AEC technique is well known, also in the dental field for intraoral X-rays with digital X-ray image receivers, see e.g. EP1859659A1 and U.S. Pat. No. 6,898,268 B2.

X-ray image detectors have optimized dynamic ranges for typical exposure situations in intraoral X-ray diagnostics. Under-exposed images are characterized by increased noise, while overexposed areas can no longer resolve the signal due to saturation effects of the pixels. Using the AEC technique, the saturation limit can be resolved by taking multiple exposures and summing up the individual recordings. By lowering the saturation limit, the X-ray image receiver can be optimized for low exposures. With this constellation, the user can specifically determine the minimum image quality required in each case, depending on the indication, in order to keep the patient dose as low as possible.

The exposure situation can be measured with a scout shot. Information on the exposure level of this first shot is used for this purpose. This indicates which maximum value of a certain number of pixels has been reached or exceeded. It can also be a relative value with reference to a maximum permissible value, e.g., in percent to the saturation limit. Information on the exposure level can also be contained in the respective histogram.

In AEC X-ray systems with scout shot, rapid evaluation of the pre-exposed images is required to determine the complete X-ray exposure in order to reduce movement artifacts that can be caused by movements of the recording geometry during the recording session. Up to now, the evaluation of the exposure level of the scout shot has been performed detached from the intraoral X-ray sensor (hereinafter also referred to as "sensor" for short) by an evaluation unit located in the X-ray device (or in the connected computer). The procedure to date is as follows:
1. Sensor detects the 1st shot
2. Sensor transmits the 1st shot to the X-ray device
3. Evaluation unit analyzes 1st shot in X-ray device
4. Evaluation unit determines exposure level for the 2nd shot
5. Sensor detects the 2nd shot
6. Sensor transmits the 2nd shot to the X-ray device
7. Evaluation unit calculates the summed image from the 1st shot and 2nd shot in the X-ray device Generally, the intraoral X-ray device with AEC functionality is connected to a computer or cloud. The intraoral X-ray sensor, which is set to exposure readiness, detects the start of an X-ray image and captures the X-ray image. After the exposure, the X-ray image data is read out from the intraoral X-ray detector and forwarded to the computer.

SUMMARY OF THE INVENTION

The objective of the present invention is to provide an intraoral X-ray sensor with integrated AEC functionality for use with an intraoral X-ray system.

This objective has been achieved by the intraoral (IO) X-ray sensor with integrated AEC functionality according to claim 1. The subject-matter of the dependent claims relate to further developments and preferred embodiments.

According to the present invention, the analysis of the scout image or video stream with respect to the exposure level is performed by the IO X-ray sensor, not by the X-ray device. For this purpose, the video stream can be used, for example, as an independent sequence of individual images.

If the above evaluation is moved to the IO X-ray sensor (hereinafter also referred to as "sensor" for short), the data transfer and the complexity on the side of the X-ray device are reduced. The process according to the invention is then e.g. as follows:
1. Sensor detects the 1st shot (scout shot);
2. Evaluation unit (e.g. an exposure analysis unit of the sensor) analyzes 1st shot and compiles information on exposure level;
3. Information on the exposure level, as well as sensor properties if applicable, is transmitted to the decision unit outside the sensor;
4. Decision unit determines the exposure parameters of further shots based on this and other information;
5. According to this decision, none, or one or more exposures are taken by the sensor;
6. Sensor transmits individual recordings and/or (optionally) at least one summed recording to the X-ray device or PC.

An essential feature of the present invention is, that the electronics associated with the IO X-ray sensor (e.g., an exposure analysis unit) is capable of capturing information about the exposure level of the scout image or video stream and communicating this information to the X-ray device. This reduces the initialization effort and speeds up the process.

The X-ray device, in particular the decision unit of the X-ray device, uses this information on the exposure level and other specifications preferably sensor specific properties, required image quality, indication, kV adjustment for dual energy, increased dynamic range (high dynamic range ((HDR)), dose dependent noise behavior, etc. to set exposure parameters e.g. number of recording, exposure time, tube current and tube voltage, for the subsequent exposure. This could be one further exposure, but also several or no further exposure.

In the case of a video stream, when a value calculated by the decision unit of the X-ray device is reached, the exposure is preferably stopped by the X-ray device.

The IO X-ray sensor head or the X-ray sensor connector is the preferred accommodation for the evaluation unit (e.g. exposure analysis unit). Alternatively, the sensor head could be wirelessly connected to the X-ray device so that no connector is required.

BRIEF DESCRIPTION OF THE DRAWING

In the following description, the present invention will be explained in more detail by means of embodiment examples with reference to the drawing, whereby FIG. 1—shows a schematic diagram of an intraoral X-ray system (3) with an AEC capable IO X-ray sensor according to one embodiment of the invention.

DETAILED DESCRIPTION OF THE INVENTION

The reference numbers shown in the drawing designate the elements listed below, which are referred to in the following description of the exemplary embodiments.
1. Intraoral X-ray sensor with AEC functionality
1.1 Communication interface
1.2 Exposure Analysis Unit
1.3 Imaging X-ray detector
1.4 Controller
1.5 Sensor-specific properties (memory)
1.6 Image memory
2. X-ray device
2.1 Communication interface
2.2 Decision unit
2.3 X-ray source
2.4 Controller
2.5 Communication interface
2.6 Power supply and high voltage source
2.7 User interface
3 Intraoral X-ray system
4.1 Computer
4.2 User interface and display
5. Network
6. Cloud FIG. 1 shows a schematic diagram of an intraoral X-ray system (3) according to an embodiment of the invention. The intraoral X-ray system (3) has an intraoral X-ray device (2) connected to an intraoral X-ray sensor (1). The connection is preferably a cable connection. The IO X-ray sensor (1) consists of a sensor head (housing), cable and connector. The IO X-ray sensor (1) is connected to the intraoral X-ray device (2) via this connector. Preferably, other sensors (1) with the same AEC functionality can be connected simultaneously to the IO X-ray device (2) via their connectors. Alternatively, a wireless connection can be used. The intraoral X-ray sensor (1) has a communication interface (1.1), an exposure analysis unit (1.2), an imaging X-ray detector (1.3), a controller (1.4), a memory (1.5) containing the sensor-specific properties, and an image memory (1.6). The controller (1.4) has access to all components of the IO X-ray sensor (1), including the communication interface (1.1), the exposure analysis unit (1.2), the imaging X-ray detector (1.3), the memory (1.5), and the image memory (1.6) to control them. The image memory (1.6) stores part or all of the image data received from the imaging X-ray detector (1.3).

The image memory (1.6) is useful if pixel image data from the imaging X-ray detector (1.3) cannot be read out for evaluation without loss of signal, or if loss of signal is unacceptable for reasons of radiation hygiene. Preferably, the X-ray sensor (1) can be equipped with a battery and wireless communication. This allows a cable to be dispensed with. A wired data communication and/or power supply can also be considered as an alternative. Here, a USB interface or Power over Ethernet (POE) is suitable as a standard.

The intraoral X-ray sensor (1) includes components for an automatic exposure control (AEC) functionality, which is explained in more detail below. The scout shot or scout video stream received from the imaging X-ray detector (1.3) is analyzed locally in the intraoral X-ray sensor (1) by the exposure analysis unit (1.2) to record information on the exposure level. The analysis result including the exposure level information is forwarded to the intraoral X-ray device (2) or to another external device (e.g. a computer) by means of the communication interface (1.1). The intraoral X-ray device (2) has corresponding communication interfaces (2.1; 2.5) for this purpose. The intraoral X-ray unit (1) has a decision unit (2.2) which evaluates the analysis result including the recorded information on the exposure level and decides on the sequence of further exposures, in particular the number of shots and their duration. In the case of a video stream, this can also be done during the ongoing exposure. When using a video stream, the first shot and second shot expands to the set of first "m" shots and second "n" shots. In this case, the process can also be repeated multiple times. The IO X-ray sensor (1) remains in corresponding recording readiness until the end of the recording session. The intraoral X-ray unit (1) also has an X-ray source (2.3), a power supply and high-voltage source (2.6) and a controller (2.4). The controller (2.4) also has access to the IO X-ray sensor (1), among other things. The intraoral X-ray device (1) is preferably in particular a small-format X-ray device for dental treatments. The decision unit (2.2) is further designed to take into account the sensor-specific properties (1.5) and/or image quality parameters specified by the user. The sensor-specific properties (1.5) include information on, among other things, sensor dimensions, local pixel errors, dose/signal behavior, and the maximum saturation level above which saturation effects occur that allow no or limited digitization of the analog exposure signal. The image quality parameters can be entered by the user directly or indirectly through a user interface (2.7) on the X-ray device (2). An indirect specification can be made via the medical indication (e.g. clarification of suspected caries, paradentosis, root course), which is converted into exposure parameters by the intraoral X-ray system (3) with the decision unit (2.2), e.g. maximum exposure, dual energy etc. . . . Alternatively, this can also be carried out via a user interface (4.2) of a computer (4.1) connected to the intraoral X-ray device (2). The intraoral X-ray device (2) is connected to a computer (4.1) via its communication interface (2.5) and preferably via a network (5). The intraoral X-ray device (2) and the computer (4.1) may also have a connection to a cloud (6). Instead of the IO X-ray sensor (1) or the IO X-ray device (2) performing image processing functions, this can be done in the cloud (6) or by the PC (4.1). The received raw image material is processed into an initial raw image to compensate for sensor and recording specific deficiencies. These are: Gain, Blemish and DC correction (classic), dynamic range extension (high dynamic range (HDR)), motion artifact compensation (anti-shake).

The invention claimed is:
1. An intraoral X-ray sensor for use with an intraoral X-ray system having an automatic exposure control (AEC) functionality comprising:
   an exposure analysis unit;
   a memory with sensor-specific properties;
   an imaging X-ray detector; and
   a communication interface,
   wherein a scout shot or a scout video stream received from the imaging X-ray detector is analyzed by the exposure analysis unit in the intraoral X-ray sensor to record information on an exposure level of the scout shot or the scout video stream and to forward the information on the exposure level and the sensor-specific properties via the communication interface to a decision unit of the intraoral X-ray system which is arranged externally to the intraoral X-ray sensor, and adapted for evaluation and decision of further exposures, wherein the sensor-specific properties comprise information on sensor dimensions, local pixel errors, dose/signal behavior, and a maximum saturation level, above which limited digitation of an analog exposure signal is allowed.

2. The intraoral X-ray sensor according to claim 1, further comprising:

an image memory which partially or completely stores image data received from the imaging X-ray detector.

3. An intraoral X-ray system comprising:

an intraoral X-ray sensor comprising an exposure analysis unit, wherein a scout shot or a scout video is analyzed by the exposure analysis unit to record information on an exposure level of the scout shot or the scout video and forward this information on the exposure level and sensor-specific properties to a decision unit, wherein the sensor-specific properties comprise information on sensor dimensions, local pixel errors, dose/signal behavior, and a maximum saturation level, above which no or limited digitation of an analog exposure signal is allowed; and an intraoral X-ray device including an automatic exposure control (AEC) functionality, wherein the intraoral X-ray device and the intraoral X-ray sensor are connected by communication interfaces, and wherein the intraoral X-ray device includes the decision unit that evaluates the information on the exposure level of the scout shot or the scout video received from an imaging X-ray detector of the intraoral X-ray sensor, and decides on a sequence of further exposures, including a number of shots and their duration, wherein the intraoral X-ray device has a controller that has access to the intraoral X-ray sensor, and the decision unit is further designed to take the sensor-specific properties into account when deciding on the sequence of further exposures.

4. The intraoral X-ray system according to claim 3, wherein the decision unit is further adapted to take into account the sensor-specific properties or image quality parameters specified by a user.

* * * * *